THOMAS W. MILLER.

Improvement in Washing Machines.

No. 120,310.  Patented Oct. 24, 1871.

Witnesses  Inventor

UNITED STATES PATENT OFFICE.

THOMAS W. MILLER, OF MONTEZUMA, INDIANA.

IMPROVEMENT IN WASHING-MACHINES.

Specification forming part of Letters Patent No. 120,310, dated October 24, 1871.

*To all whom it may concern:*

Be it known that I, THOMAS W. MILLER, of Montezuma, in the county of Parke and State of Indiana, have invented certain new and useful Improvements in Washing-Machines; and I do hereby declare that the following is a full, clear, and exact description thereof, reference being had to the accompanying drawing and to the letters of reference marked thereon, which form a part of this specification.

The nature of my invention consists in the construction and arrangement of a washing-machine, as will be hereinafter more fully set forth.

In order to enable others skilled in the art to which my invention appertains to make and use the same, I will now proceed to describe its construction and operation, referring to the annexed drawing, in which—

Figure 1:
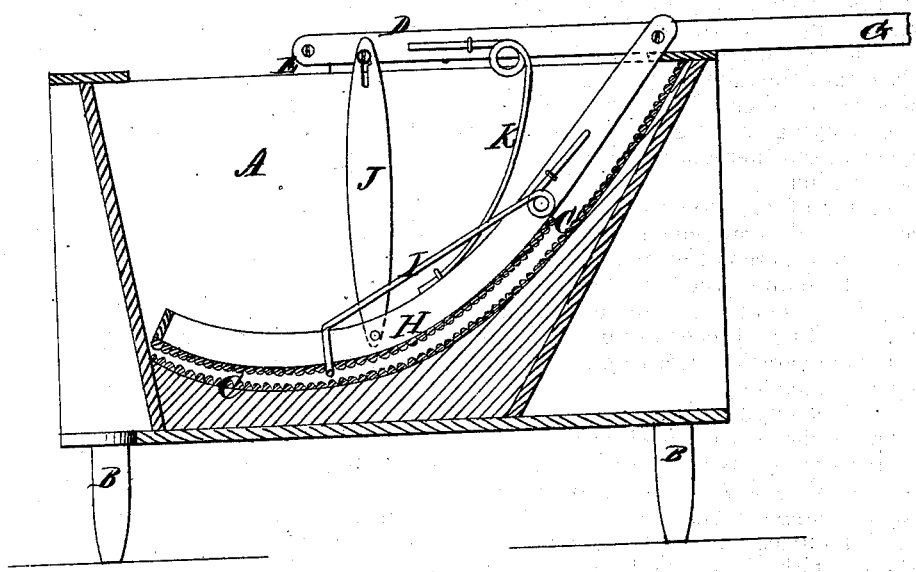
Figure 2:
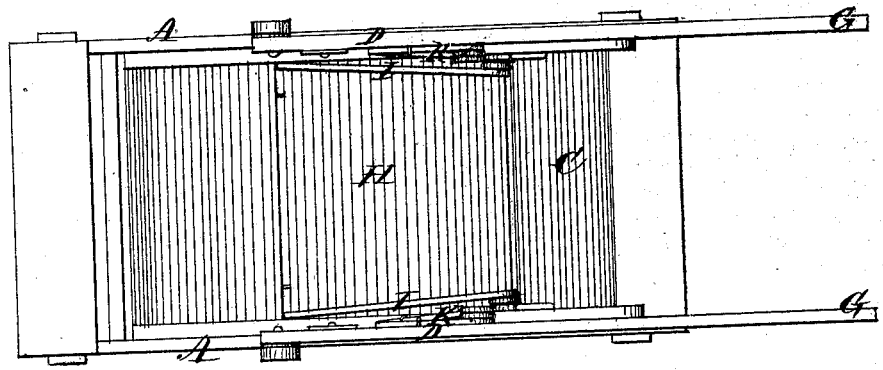

Figure 1 is a longitudinal vertical section, and Fig. 2 a plan view of my machine.

A represents the box or tank in which the clothes are to be washed, said box being provided with inclined ends, as shown in Fig. 1, and supported upon legs B B. On the bottom and up one end of the box A is formed a concave wash-board, C, composed of round, oval, or other suitably-shaped bars or slats set crosswise in the box, as shown. To bars E E, attached to the sides of the box, are pivoted levers D D, the outer ends of which are connected by the handle G. To these handles are pivoted the side arms of a convex rubber, H, which is also composed of bars or slats the same as the wash-board above described. To the side arms of the rubber H are attached the ends of a wire spring, I, a portion of each end of which is coiled, as shown, and the center passes across the outer surface of the rubber. This spring holds the fabric to be washed to the rubber by the fabric being drawn through between the rubber and the center of the spring. The rubber is further connected with the levers D D by means of slotted arms J J or braces, which admit of the rubber rising when pressed on by the fabric; and the rubber is depressed by means of springs K K attached to the levers and bearing on the side pieces of the rubber, thereby squeezing the fabric between the rubber and the wash-board. The levers, being successively worked up and down, cause the rubber to oscillate, thereby cleansing the fabric.

Having thus fully described my invention, what I claim as new, and desire to secure by Letters Patent, is—

1. The wire spring I, constructed as shown and described, and arranged upon the rubber H, substantially as and for the purposes herein set forth.

2. The combination of the levers D D, rubber H, slotted arms J J, and springs K K, all constructed and arranged substantially as and for the purposes herein set forth.

3. The combination of the box A, wash-board C, rubber H, levers D D, arms J J, and springs K K and I, all constructed and arranged to operate substantially as and for the purposes herein set forth.

In testimony that I claim the foregoing as my own I affix my signature in presence of two witnesses.

THOMAS W. MILLER.

Witnesses:
ALFRED MCDONALD,
FRANK BISSUR. (91)